(12) United States Patent
Wiant et al.

(10) Patent No.: US 10,411,453 B1
(45) Date of Patent: Sep. 10, 2019

(54) ELECTRICAL BUS ASSEMBLIES, YOKE BRACE APPARATUS, BUS BAR SUPPORT ASSEMBLIES, AND METHODS

(71) Applicant: Siemens Industry, Inc., Alpharetta, GA (US)

(72) Inventors: Jason P. Wiant, Bedford, TX (US); Jason Parkerson, Mansfield, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/961,929

(22) Filed: Apr. 25, 2018

(51) Int. Cl.
*H02G 5/00* (2006.01)
*H02G 5/02* (2006.01)
*H02G 1/14* (2006.01)
*H01B 7/02* (2006.01)

(52) U.S. Cl.
CPC ............... *H02G 5/025* (2013.01); *H01B 7/02* (2013.01); *H02G 1/14* (2013.01)

(58) Field of Classification Search
CPC ... H02G 5/06; H02G 5/025; H02G 1/14; H02G 5/00; H05K 5/00; H05K 5/02; H05K 5/0069; H05K 7/00; H01B 1/026; H01B 7/02; H02B 1/20; H02B 1/205; H02B 1/207; H02B 1/21; H02B 1/22; H02B 1/30
USPC ........... 174/50, 520, 71 B, 68.2, 88 B, 70 B, 174/91 B, 541; 361/600, 601, 611, 624, 361/637, 648, 679.01, 775
See application file for complete search history.

(56) References Cited

U.S. PATENT DOCUMENTS

| | | | | |
|---|---|---|---|---|
| 4,025,826 A * | 5/1977 | Wilson | ..................... | H02B 1/21 174/133 B |
| 4,099,220 A * | 7/1978 | Kovatch | .................. | H02B 1/21 174/68.2 |
| 4,627,680 A * | 12/1986 | Weimer | ................. | H02G 5/007 174/88 B |
| 4,849,581 A * | 7/1989 | Larkin | ................... | H02G 5/007 174/88 B |
| 5,821,464 A * | 10/1998 | Graham | ................. | H02G 5/007 174/86 |
| 6,040,976 A | 3/2000 | Bruner et al. | | |
| 6,111,745 A | 8/2000 | Wilkie et al. | | |
| 6,169,248 B1 | 1/2001 | Rowe et al. | | |
| 6,329,598 B1 * | 12/2001 | M'Sadoques | .......... | H02G 5/007 174/68.2 |
| 6,435,888 B1 * | 8/2002 | Reed, Jr. | .................. | H01R 4/30 174/88 B |

(Continued)

*Primary Examiner* — Angel R Estrada (57) ABSTRACT

An electrical bus bar assembly including yoke brace apparatus providing support and maintaining a spacing distance D between electrical bus bars. The electrical bus bar assembly includes a first electrical bus bar, a second electrical bus bar spaced the distance D from the first electrical bus bar, and a yoke brace apparatus coupled between the first electrical bus bar and the second electrical bus bar. The yoke brace apparatus includes an insulating yoke brace spacer, a first yoke bracket coupled to the yoke brace spacer on a first end and also coupled to the first electrical bus bar, and a second yoke bracket coupled to the yoke brace spacer on a second end and also to the second electrical bus bar. Yoke brace apparatus, bus bar mounting assemblies, and supported electrical bus bar assemblies and methods of supporting electrical bus bars are disclosed, as are other aspects.

21 Claims, 8 Drawing Sheets

(56) References Cited

U.S. PATENT DOCUMENTS

| | | | |
|---|---|---|---|
| 6,489,567 B2* | 12/2002 | Zachrai | H02G 5/025 174/149 B |
| 6,781,818 B2* | 8/2004 | Josten | H02B 1/21 174/149 B |
| 6,888,066 B1* | 5/2005 | Wiant | H02B 1/21 174/68.2 |
| 6,934,147 B2* | 8/2005 | Miller | H02B 1/21 174/68.2 |
| 7,075,021 B2 | 7/2006 | Rowe et al. | |
| 8,289,680 B2* | 10/2012 | Keegan | H05K 7/1432 174/117 R |
| 8,437,118 B2 | 5/2013 | Kasza et al. | |
| 8,697,993 B2* | 4/2014 | Jur | H02G 5/06 174/68.2 |
| 8,717,741 B2 | 5/2014 | Valenzuela | |
| 9,006,571 B2* | 4/2015 | Manhart | H02B 1/21 174/129 B |
| 9,144,161 B2 | 9/2015 | Kozuru et al. | |
| 9,391,413 B2 | 7/2016 | Blasbalg et al. | |
| 9,622,374 B2 | 4/2017 | Bhattacharya et al. | |
| 9,705,294 B2 | 7/2017 | Kubota et al. | |

\* cited by examiner

ELECTRICAL BUS ASSEMBLIES, YOKE BRACE APPARATUS, BUS BAR SUPPORT ASSEMBLIES, AND METHODS

FIELD

The present disclosure relates to apparatus, assemblies, and methods for electrical power distribution, and specifically to run-over bus assemblies.

BACKGROUND

In switchgear and switchboard systems, run-over buses, such as A, B, and C phase run-over buses can connect between circuit breakers and terminal blocks. For example, in one implementation, run-over buses can connect between a load side of a circuit breaker and terminal blocks configured to attach to load cables. Running near these run-over buses can be various buses (e.g. horizontal buses) that carry A, B, and C phase line current to the line side of the circuit breakers. The horizontal buses can be interconnected to three-phase line power, for example. Within such switchgear there may be multiple circuit breakers, each having A, B, and C phase run-over buses connected thereto.

In such switchgear, it is desired to move the components as close together as possible to minimize overall space envelope. Such close proximity of various buses, such as run-over buses and thru (horizontal) buses under normal operating conditions is not problematic. However, such close proximity during a short-circuit event can cause substantial forces and bending of various components and if such bending is sufficiently large, it could be possible to have phase-to-phase short circuits or undesirable arcing. Forces encountered during such short-circuit events are approximately inversely proportional to the spacing between the various bus bars.

Thus, there is a need to improve various bus assemblies to improve strength thereof and allow such close proximity positioning of the bus bars therein.

SUMMARY

According to a first embodiment, an electrical bus assembly is provided. The electrical bus assembly includes a first electrical bus bar, a second electrical bus bar spaced a distance from the first electrical bus bar, and a yoke brace apparatus coupled between the first electrical bus bar and the second electrical bus bar, the yoke brace apparatus comprising: a yoke brace spacer including a first end and a second end, a first yoke bracket coupled to the yoke brace spacer on the first end, the first yoke bracket coupled to the first electrical bus bar, and a second yoke bracket coupled to the yoke brace spacer on the second end opposite from the first end, the second yoke bracket coupled to the second electrical bus bar.

According to another embodiment, a yoke brace apparatus is provided. The yoke brace apparatus includes a yoke brace spacer including a first end and a second end, a first yoke bracket coupled to the yoke brace spacer on the first end, the first yoke bracket including a first channel configured to couple to a first electrical bus bar, and a second yoke bracket coupled to the yoke brace spacer on the second end opposite from the first end, the second yoke bracket including a second channel configured to couple to a second electrical bus bar, wherein the yoke brace apparatus is configured to maintain a fixed axial spacing between the first channel and the second channel.

According to another embodiment, an electrical bus bar support apparatus for an electrical bus bar is provided. The electrical bus bar support apparatus includes a support structure configured to couple to a switchgear cabinet, a mounting bracket including a first attachment portion configured to couple to the support structure, and a first tab and a second tab each extending from the first attachment portion, and an insulating support coupled to the first tab and the second tab, the insulating support including a rear bus bar support portion, a first bus bar end support, and a second bus bar end support extending from the rear bus bar support portion and forming a bus bar-receiving opening.

According to another embodiment, a supported electrical bus bar assembly is provided. The supported electrical bus bar assembly includes an electrical bus bar support apparatus including a support structure, a mounting bracket including a first attachment portion configured to couple to the support structure, a first tab and a second tab each extending from the first attachment portion, and an insulating support coupled to the first tab and the second tab, the insulating support including a rear bus bar support portion, a first bus bar end support, and a second bus bar end support extending from the rear bus bar support portion and forming a bus bar-receiving opening, a first electrical bus bar received in the bus bar-receiving opening, a second electrical bus bar extending parallel to the first electrical bus bar and spaced a distance therefrom, and a yoke brace apparatus coupled between the first electrical bus bar and the second electrical bus bar, the yoke brace apparatus comprising: a yoke brace spacer including a first end and a second end, a first yoke bracket coupled to the yoke brace spacer on the first end, the first yoke bracket coupled to the first electrical bus bar, and a second yoke bracket coupled to the yoke brace spacer on the second end opposite from the first end, the second yoke bracket coupled to the second electrical bus bar.

According to another embodiment, a method of supporting electrical bus bars is provided. The method includes providing a first electrical bus bar, providing a second electrical bus bar spaced a distance from the first electrical bus bar, and supporting and maintaining the distance between the first electrical bus bar and the second electrical bus bar with a yoke brace apparatus, wherein the yoke brace apparatus has an insulating yoke brace spacer including a first end and a second end, a first yoke bracket coupled to the first end, wherein the first yoke bracket is coupled to the first electrical bus bar, and a second yoke bracket coupled on the second end, wherein the second yoke bracket is coupled to the second electrical bus bar.

Still other aspects, features, and advantages of the present disclosure may be readily apparent from the following description by illustrating a number of example embodiments, including the best mode contemplated for carrying out the present disclosure. The present invention may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the invention in any way. Wherever possible, the same or like reference numbers will be used throughout the drawings to refer to the same or like parts.

DETAILED DESCRIPTION

Reference will now be made in detail to the embodiments of this disclosure, examples of which are illustrated in the accompanying drawings. The aforementioned problems of prior art electrical bus bar assemblies can be overcome by one or more embodiments of the present disclosure. In particular, the use of the inventive supported electrical bus bar assemblies, electrical bus bar assemblies, yoke brace apparatus, and electrical bus bar support assemblies can provide substantially rigid and adequately supported bus bar structures. As such, minimal absolute and relative motion of the various supported bus bars, such as run-over bus bars, can be provided when high current, short-circuit events are encountered. In particular, during such short circuits events, large attraction or repulsion forces may be present, such as between various phase run-over bus bars or between run-over bus bars and other bus bars, such as horizontal bus bars.

In one embodiment, an electrical bus bar assembly is provided. The electrical bus bar assembly includes a first electrical bus bar and a second electrical bus bar and one or more yoke brace apparatus coupled between the first electrical bus bar and the second electrical bus bar so as to support and maintain a desired fixed spacing between the first electrical bus bar and the second electrical bus bar.

In another broad aspect capable of independent use, a yoke brace apparatus is provided that comprises a yoke brace spacer with first and second yoke brackets coupled to respective ends of the yoke brace spacer. The first and second yoke brackets couple to a first electrical bus bar and a second electrical bus bar, respectively, and include channels formed therein that are configured to receive the first electrical bus bar and the second electrical bus bar there through.

In another broad aspect capable of independent use, an electrical bus bar support apparatus for an electrical bus bar is provided. The electrical bus bar support apparatus includes a support structure configured to couple to a switchgear cabinet, such as to frame uprights thereof, a mounting bracket including a first attachment portion configured to couple to the support structure, and a first tab and second tab each extending from the first attachment portion, and an insulating support coupled to the first tab and the second tab, the insulating support including a rear bus bar support portion, a first bus bar end support, and a second bus bar end support extending from the rear bus bar support portion and together forming a bus bar-receiving opening. The bus bar-receiving opening is configured to receive an electrical bus bar therein.

One or more embodiments of the disclosure will now be explained in greater detail with reference to FIGS. 1A-5 below. FIGS. 1A-3 illustrate one or more embodiments of the supported electrical bus bar assembly 100 and subcomponents thereof, such as an electrical bus bar assembly, a yoke brace apparatus, and an electrical bus bar mounting assembly, that can be used within an electrical power distribution enclosure 400 (e.g., switchgear cabinet) as shown in FIG. 4.

Figure 4:
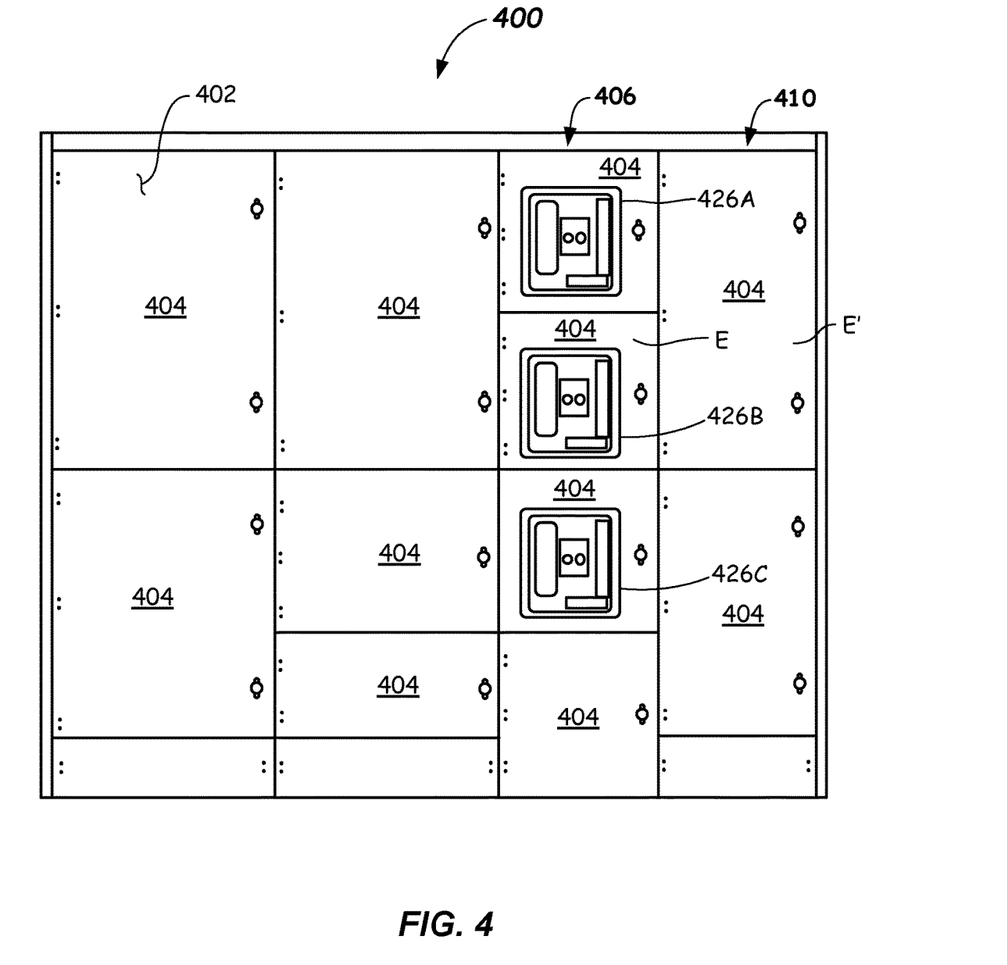
FIG. 4 illustrates a front plan view of a switchgear cabinet including one or more supported electrical bus bar assemblies and components thereof according to one or more embodiments.

FIG. 4 illustrates a front elevation view of an exterior of an electrical power distribution enclosure 400 according to one or more embodiments. The electrical power distribution enclosure 400 may include a front surface 402 including a plurality of panels 404 (a few labeled). A first plurality of the panels 406 (e.g., a column of panels 404) may include user interfaces, which may include controls, such as circuit breakers and other controllers and/or monitors to control and possibly monitor power distribution to different locations. As depicted in FIG. 4, the user interface zone includes three user interfaces, referred to individually as a first user interface 426A, a second user interface 426B, and a third user interface 426C. In the embodiment depicted in FIG. 4, the first plurality of panels 406 of the may be vertically aligned.

A second plurality of panels 410 may contain behind them portions of run-over bus bars and portions of horizontal bus bars. The other portions can be present behind the first plurality of panels 406. The horizontal bus bars can interconnect to line power, for example. Terminal blocks and the like that can electrically connect to electrical loads and allow power to be distributed thereto. Such terminal blocks can be connected or interconnected to the run-over bus bars. The second plurality of panels 410 and components behind them are collectively referred to as the terminal and bus section. In the embodiment depicted in FIG. 4, the plurality of panels 410 of the terminal and bus section may both be vertically aligned. The first plurality of panels 406 may be adjacent or abut the second plurality of panels 410.

Reference is made to a panel 404 labeled E in the user interface zone and to panel 404 labeled E' in the terminal and bus section, which may be representative of other panels in their respective sections. The panel E' may be opened or removed to enable a user to have access within the terminal and bus section. Terminal block assemblies (not shown in FIG. 4) located behind the panel E' may be electrically connected to cables that provide power to locations and electrical loads, as described above. Similarly, run-over bus bars, such as A-phase, B-phase, and C-phase run-over bus bars can be at least part located behind the panel E'. The panel E may include a user interface 426B, an can include components such as controls, switches, monitors, and/or circuit breakers that control and/or monitor the power distributed via the terminal assemblies located behind the panel E'. Run-over bus bars electrically interconnect between the circuit breakers and the terminal blocks, for example.

Figure 1A:
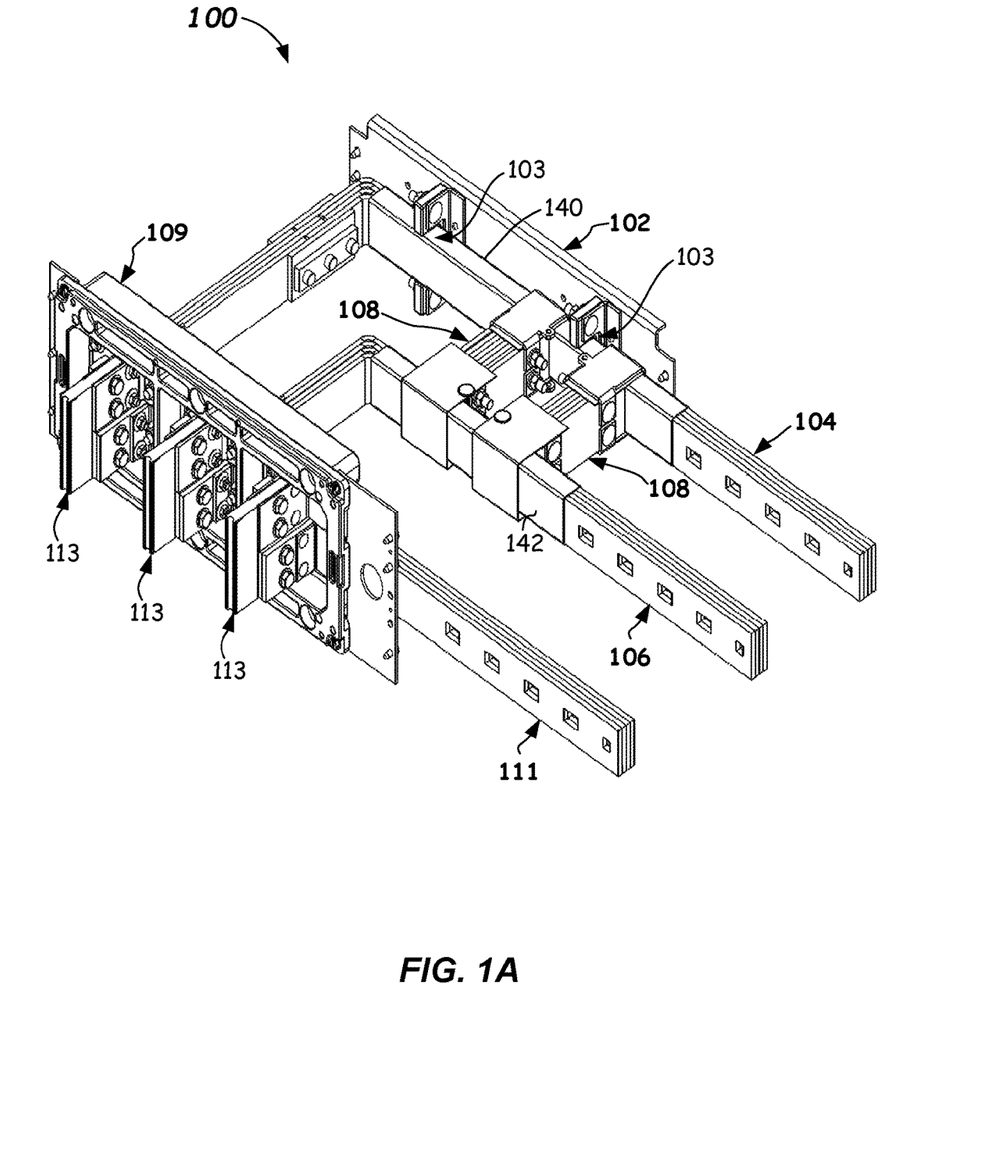
FIG. 1A illustrates a perspective view of a supported electrical bus bar assembly according to embodiments.
Figure 1B:
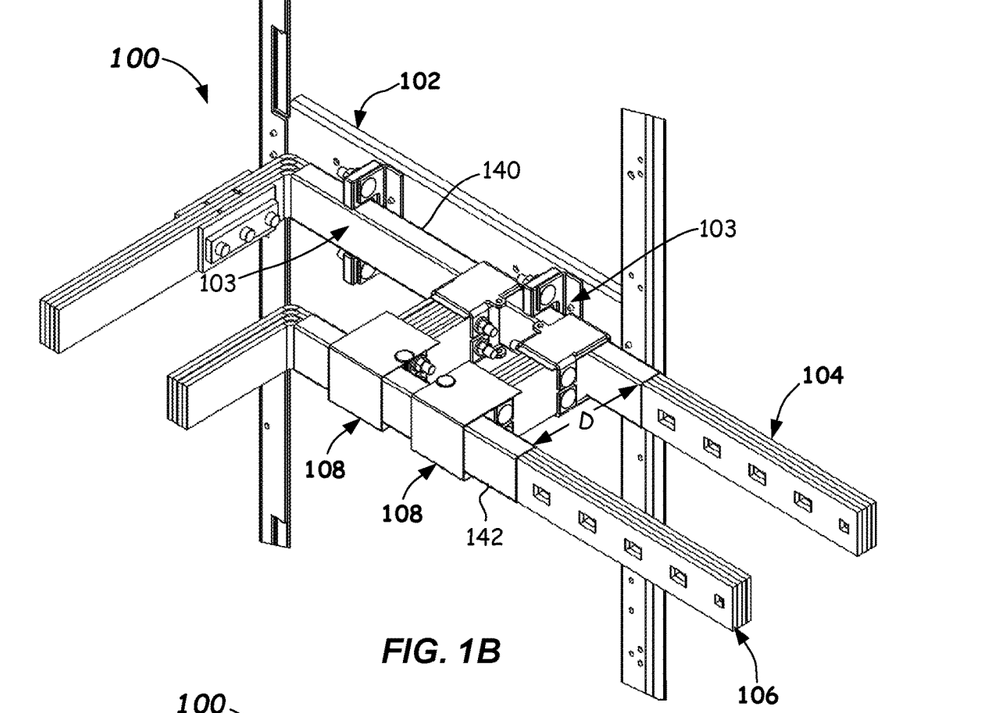
FIG. 1B illustrates a partial perspective view of the supported electrical bus bar assembly according to embodiments.
Figure 1C:
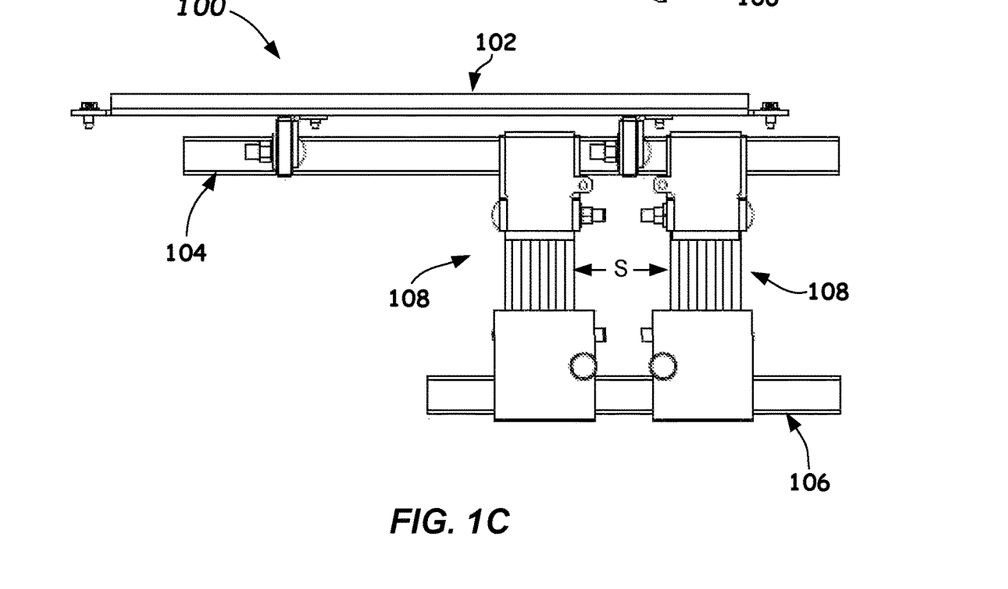
FIG. 1C illustrates a partial top plan view of the supported electrical bus bar assembly according to embodiments.

Now referring to FIG. 1A-1C, a supported electrical bus bar assembly 100 is shown. The supported electrical bus bar assembly 100 comprises an electrical bus bar support assembly 102 including one or more bus bar-receiving openings 103, a first electrical bus bar 104 (e.g., an A-phase run-over electrical bus bar) received in the one or more bus bar-receiving openings 103, a second electrical bus bar 106 spaced a distance D from the first electrical bus bar 104, and one or more a yoke brace apparatus 108 coupled between the first electrical bus bar 104 and the second electrical bus bar 106. In the depicted embodiment, two yoke brace apparatus 108 are shown. However, in some embodiments, only one yoke brace apparatus 108, or more than two yoke brace apparatus 108 may be used to adequately support and maintain a fixed spacing relationship of the second electrical bus bar 106 relative to the first electrical bus bar 104.

In the depicted embodiment, the portions of the second electrical bus bar 106 that are supported by the yoke brace supports 108 can extend in parallel supported portions of the first electrical bus bar 104. The one or more yoke brace apparatus 108 are coupled to the first electrical bus bar 104 and the second electrical bus bar 106 and are configured to maintain a fixed spacing distance D (FIG. 1B). The yoke brace apparatus 108 can also retain parallelism between the first and second electrical bus bars 104, 106 and can provide relative support there between.

As shown, two yoke brace apparatus 108 are included in the supported electrical bus bar assembly 100 and can be provided in a spaced relationship along the lengths of the first electrical bus bar 104 and the second electrical bus bar 106. For example, the two yoke brace apparatus 108 can be spaced a distance S of between about 10 cm and about 15 cm apart.

As shown in FIG. 1A, the first electrical bus bar 104 and the second electrical bus bar 106 may be run-over bus bars that are made of a highly-conductive material, such as copper and the like. The first electrical bus bar 104 and the second electrical bus bar 106 can include bends (e.g., right angle bends, as shown) therein. In this manner the portions supported by the bus bar support assembly 102 and the portions supported by the yoke brace apparatus 108 can run along a back portion of the cabinet 400. In particular, the first electrical bus bar 104 and the second electrical bus bar 106 run over from the base 109, as can a third electrical bus 111 carrying C-phase electrical power.

The electrical bus bars 104, 106, 111 can include hardware 113 adjacent to the base 109 that are configured to attached to stabs of a circuit breaker (not shown). The first electrical bus bar 104, the second electrical bus bar 106, and the third electrical bus bar 111 can run over within the switchgear cabinet 400, such as across a back portion of the cabinet 400, from circuit breakers to terminal blocks and can carry A-, B-, and C-phase line power. Thus, the first electrical bus bar 104, the second electrical bus bar 106, and the third electrical bus bar 111 are configured to carry A-, B-, and C-phase power from the circuit breaker connected at the base 109. The base 109 can attach to frame supports of the switchgear cabinet 400, such as mid-frame supports (not shown), for example.

In more detail, one of the yoke brace apparatus 108 and its bus attachment structure will be described with reference to FIGS. 2A and 2B. The two yoke braces 108 shown can be identical or substantially identical to one another and provided in a spaced apart relationship (e.g., spacing S—FIG. 1C). The yoke brace apparatus 108 comprises a yoke brace spacer 210 including a first end 212 and a second end 214. The yoke brace spacer 210 can include laminated construction, i.e., having multiple insulating laminates stacked in a side-by-side orientation with one another. Each of the laminates can be made of an insulating material. Each of the laminates can be rectangular in shape as best shown in FIG. 2B, and can, by way of example, have a length L of between about 13.6 cm and 14.8 cm, a width (W in the vertical dimension) of between about 3.8 cm and 6.4 cm, and a thickness T of between about 5 mm and 8 mm, for example. Other dimensions can be used.

The laminated construction of the yoke brace spacer 210 can comprise laminates that are structural laminate components 210A having a first rigidity and spacer laminate components 210B having a second rigidity that is less than the first rigidity. For example, for a 100 kA electrical bus assembly shown, the outermost laminates can be structural laminate components 210A and the innermost laminates can be spacer laminate components 210B (a few labeled).

For example, the structural laminate components 210A can be manufactured from a rigid insulating material, such as a glass fiber epoxy laminate. One suitable rigid insulating material is FR-4. FR-4 is a composite material composed of woven fiberglass cloth with an epoxy resin binder that is flame resistant (self-extinguishing). FR-4 epoxy resin systems can employ bromine, a halogen, to facilitate flame-resistant properties. FR-4 glass epoxy laminates can have a flexural strength (A, 0.125) of greater than 415 Mpa (600, 200 psi) lengthwise, and thus are quite rigid. Other suitably rigid structural insulating materials can be used for the structural laminate components 210A.

The spacer laminate components 210B can be made of a GP03 fiberglass NEMA sheet that can encompass random mat glass material that is impregnated with a thermoset polyester resin, for example. Other suitable materials may be used for the spacer laminate components 210B. The primary function of the spacer laminate components 210B is non-structural and they are provided to space apart the structural laminate components 210A. In the depicted embodiment, two structural laminate components 210A are shown, and six spacer laminate components 210B are used in a pack. However, it should be recognized that other numbers and dimensions of the structural laminate components 210A and spacer laminate components 210B could be used to achieve the desired stiffness and dimensions. With 8 total laminates, the width of the yoke brace spacer 210 can be about 51 mm.

Figure 2A:
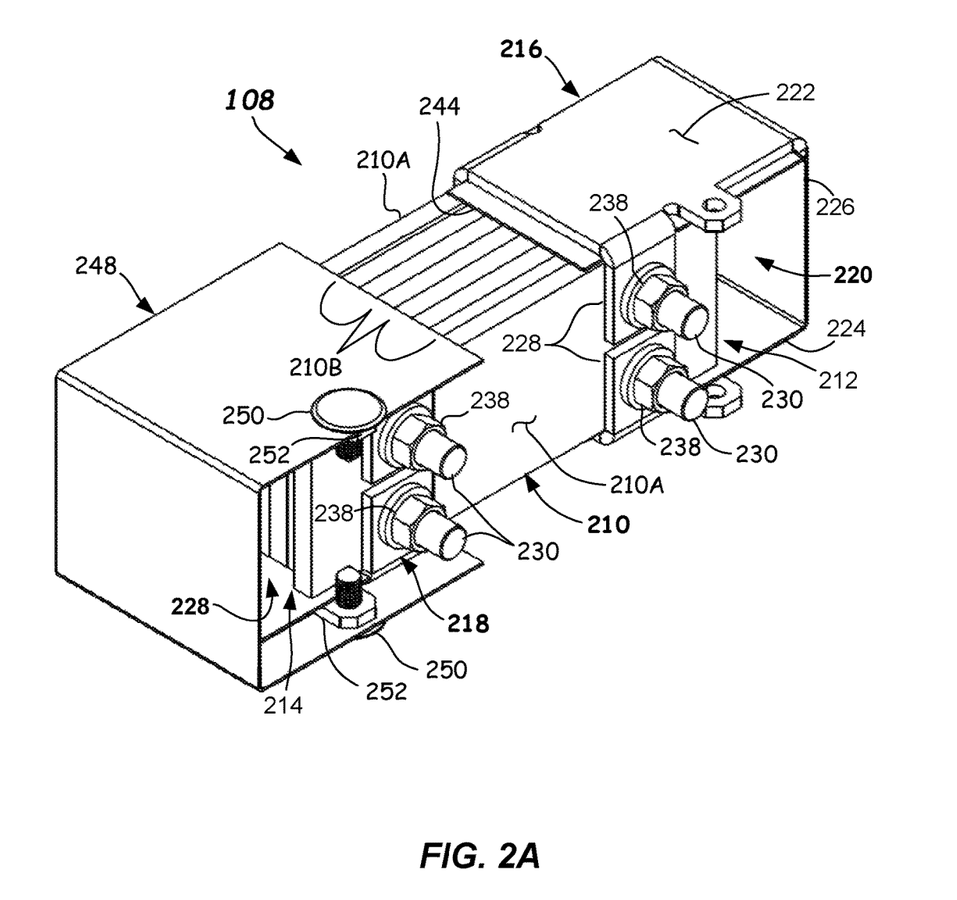
FIG. 2A illustrates a perspective view of a yoke brace apparatus according to one or more embodiments.
Figure 2B:
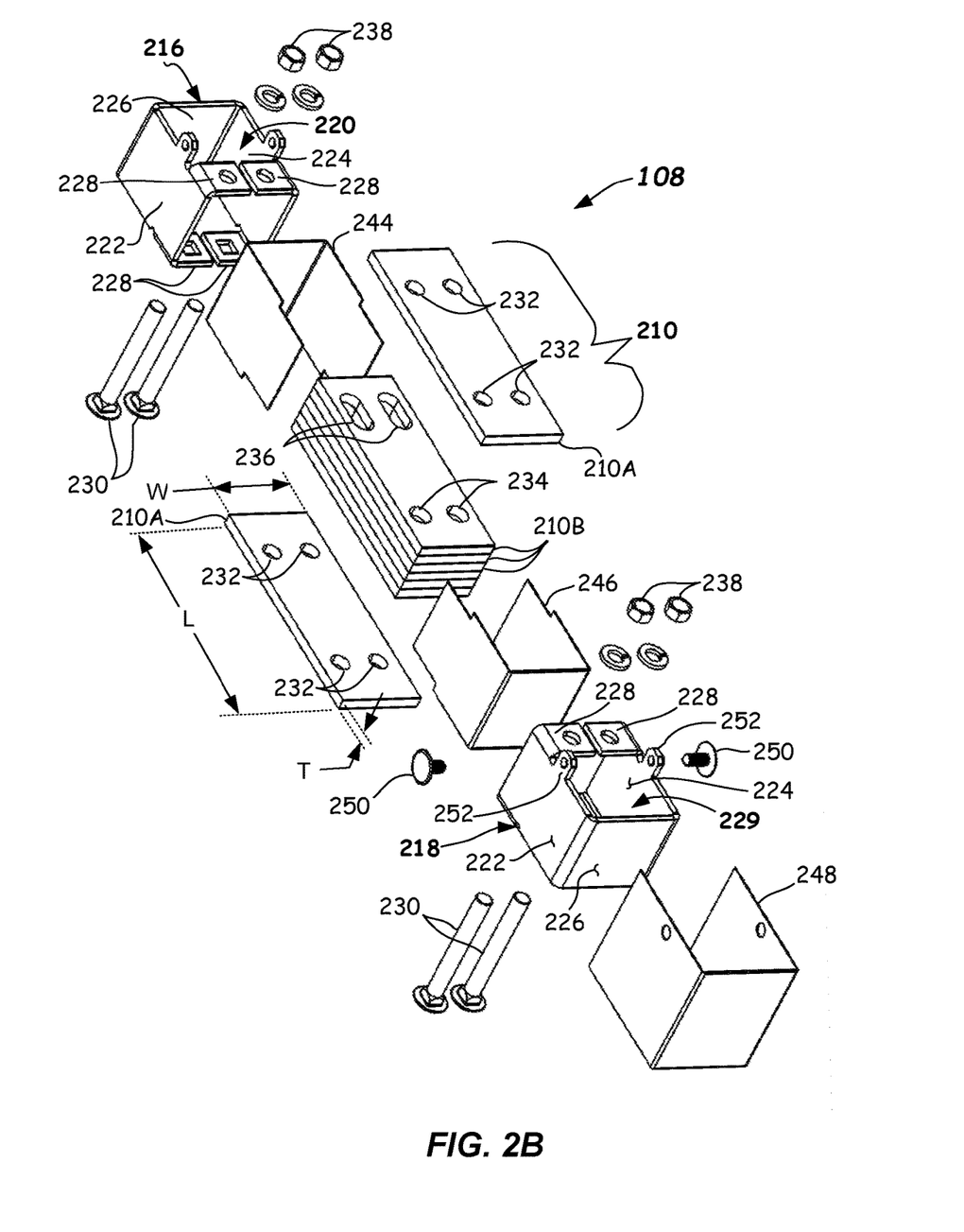
FIG. 2B illustrates an exploded perspective view of the yoke brace apparatus according to one or more embodiments.

The yoke brace apparatus 108, as best shown in FIGS. 2A and 2B, further includes a first yoke bracket 216 that is coupled to the yoke brace spacer 210 on the first end 212, and a second yoke bracket 218 coupled to the yoke brace spacer 210 on the second end 214 opposite from the first end 212. The first yoke bracket 216 can include a first channel 220 there through. The first channel 220 can be formed by structural features of the first yoke bracket 216, such as top wall 222, bottom wall 224, and end wall 226, and fastener tabs 228 or the end of the yoke brace spacer 210.

The second yoke bracket 218 can be identical or similar to the first yoke bracket 216, and can include a second channel 229 passing there through. The second channel 229 can be formed by structural features of the second yoke bracket 218, such as top wall 222, bottom wall 224, and end wall 226, and fastener tabs 228 or the end of the yoke brace spacer 210. The yoke brace apparatus 108 is assembled by attaching the first yoke bracket 216 and the second yoke bracket 218 to the yoke brace spacer 210. The attachment can be by fasteners, such as by inserting first fasteners 230 (e.g., square head bolts or the like) through holes 232 formed in the fastener tabs 228, and passing through apertures 234 and slots 236 formed in the yoke brace spacer 210, and securing by second fasteners 238 (e.g., nuts or the like). The slots 236 formed in the end of the yoke brace spacer 210 allow for some length adjustment. In particular, an adjustment of length so that the yoke brace spacer 210 can adjust to variations in the spacing distance D between the first electrical bus 104 and the second electrical bus 106. Further, various embodiments can include different lengths L of the yoke brace spacer 210 to meet the needs of the run-over bus bar installation configuration.

As shown in FIG. 1A-1C, the first end 212 of the yoke brace spacer 210 is coupled to the first electrical bus bar 104 by the first yoke bracket 216 and the second end 214 of the yoke brace spacer 210 is coupled to the second electrical bus bar 106 by the second yoke bracket 218. The first yoke bracket 216 including the first channel 220 is configured to couple to the first electrical bus bar 104. The second yoke bracket 218 is coupled to the yoke brace spacer 210 on the second end 214 opposite from the first end 212. The second yoke bracket 218 includes a second channel 229 that is configured to couple to the second electrical bus bar 106. In particular, the first channel 220 of the first yoke bracket 216 and the second channel 229 of the second yoke bracket 218 are slid over the first and second electrical bus bars 104, 106, and then second fasteners 238 may be tightened. Once secured, the yoke brace apparatus 108 is configured to maintain a fixed axial spacing distance between the first channel 220 and the second channel 229, and thus a fixed spacing distance D between the first electrical bus bar 104 and the second electrical bus bar 106.

In some embodiments, a first insulation sheathing 140 can be provided so that the first insulation sheathing 140 is wrapping about a portion of the first electrical bus bar 104 passing through the first channel 220 of the first yoke bracket 216. Likewise, in some embodiments, a second insulation sheathing 142 can be provided so that the second insulation sheathing 142 is wrapping about a portion of the second electrical bus bar 106 passing through the second channel 229 of the second yoke bracket 218. The first insulation sheathing 140 and the second insulation sheathing 142 can be any suitable insulating sheathing that wraps around the respective electrical buses 104, 106, such as a shrink fit sleeve, a molded tube, a wrap of insulation, or the like of a suitable insulating material, such as polypropylene, polyphenylene ether and polystyrene blend, polyvinylchloride (PVC), vinyl, or polyolefin, and the like. Such first insulation sheathing 140 and the second insulation sheathing 142 can be provided to meet UL requirements, flammability, and resistance to electrical path tracking.

Further, in some embodiments, a first inner insulating barrier 244 can be received within (inside of) the first yoke bracket 216. The first inner insulating barrier 244 can comprise a U-shaped configuration that partially surrounds the first electrical bus bar 104. In particular, the first inner insulating barrier 244 can extend slightly wider than the first yoke bracket 216 in the area of the first channel 220. Similarly, a second inner insulating barrier 246 can be received within (inside of) the second yoke bracket 218. The second inner insulating barrier 246 can comprise a U-shaped configuration that partially surrounds the second electrical bus bar 106 and can extend slightly wider than the second yoke bracket 218 in the area of the second channel 229. The first inner insulating barrier 244 and the second inner insulating barrier 246 can be made of any suitable insulating material, such as polypropylene or polyphenylene ether and polystyrene blend, sheet material, and cut and bent to shape. Other suitable insulating materials can be used.

In order to provide insulation around the second yoke bracket 218, an outer insulating barrier 248 can be received over the second yoke bracket 218. The outer insulating barrier 248 can comprise a U-shaped configuration that partially surrounds the second yoke bracket 218 and the supported portion of the second electrical bus bar 106. As shown in FIG. 2A, the outer insulating barrier 248 can extend slightly wider than the second yoke bracket 218 in the area of the second channel 229. In particular, the outer insulating barrier 246 can extend as wide as or slightly wider than the ends of the first fasteners 230. The outer insulating barrier 246 can be secured to the second yoke bracket 218 by push pins 250 inserted through holes in the outer insulating barrier 246 and into tangs 252 formed on the second yoke bracket 218. Other suitable means for attaching the outer insulating barrier 246 can be used.

Figure 2C:
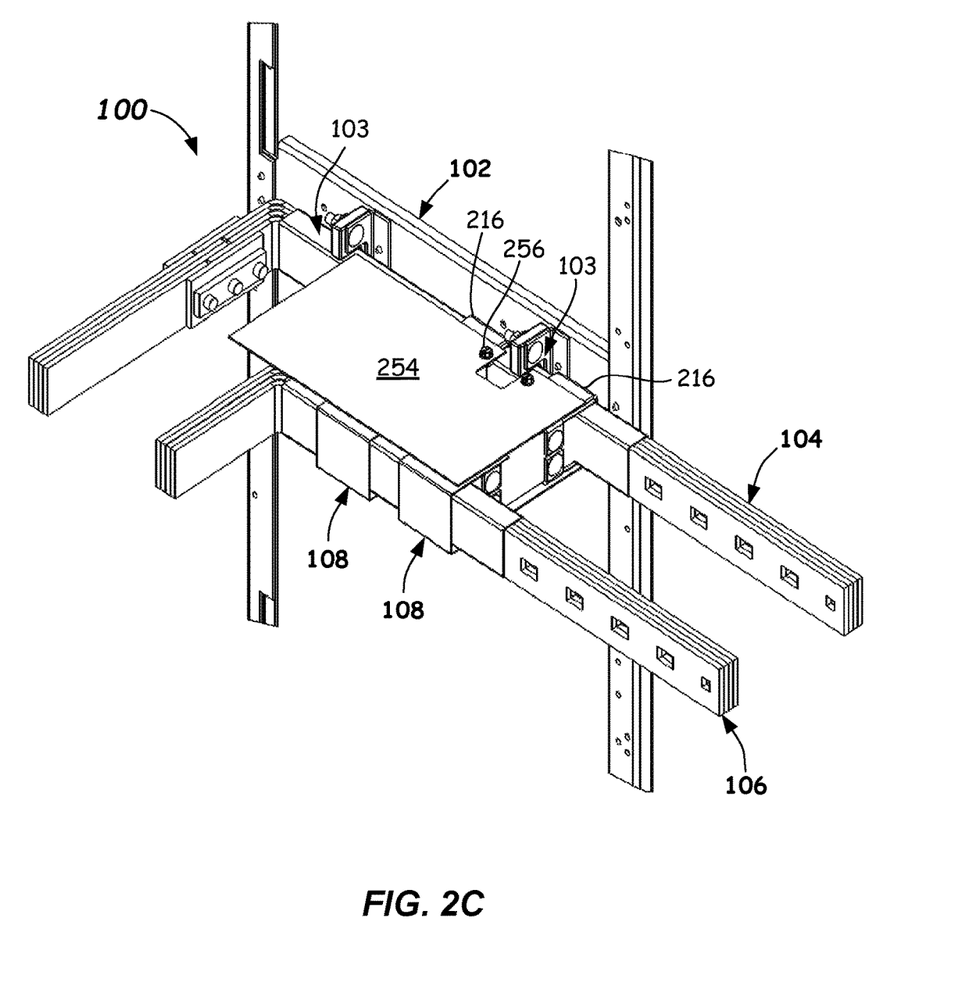
FIG. 2C illustrates a perspective view of the supported electrical bus bar assembly including an outer plate barrier covering at least a portion of the yoke brace apparatus according to one or more embodiments

In order to provide further electrical insulation above the first yoke bracket 216, an outer plate barrier 154 can be received over the first yoke bracket 216. The outer plate barrier 254 can comprise a planar sheet configuration that can cover the top wall 222 of the first yoke bracket 216. The outer plate barrier 254 can be secured to the first yoke bracket 216 by screws 250 or the like inserted through holes in the outer plate barrier 254 and threaded into tangs 252 of the first yoke bracket 216. In some embodiments, the outer plate barrier 254 can be secured to the first yoke brackets 216 of each of the yoke brace apparatus 108 in a manner that assists in maintaining the separation and spacing S of the two yoke brace apparatus 108 along the first electrical bus bar 104 and the second electrical bus bar 106. The outer plate barrier 254 can cover at least a portion of the first electrical bus bar 104 and the second electrical bus bar 106 and operates to further resist arcing between the two yoke brace apparatus 108 and bus bar structures running above the two yoke brace apparatus 108.

Figure 3:
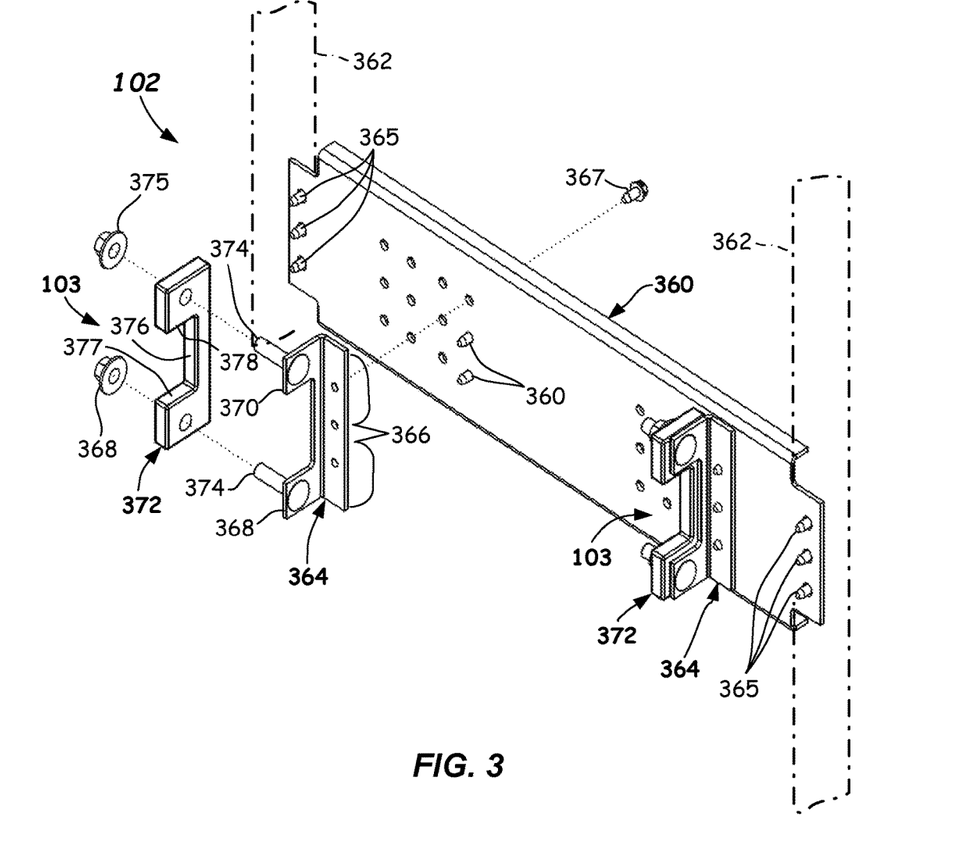
FIG. 3 illustrates an exploded view of an electrical bus bar support assembly according to one or more embodiments.

In another broad embodiment capable of independent usage with other bus bar structures, an embodiment of the electrical bus bar support apparatus 102 is provided as best shown in FIG. 3. The electrical bus bar support apparatus 102 provided support for an electrical bus bar along a length thereof, for example. The electrical bus bar support apparatus 102 comprises a support structure 360 that is configured to couple to a switchgear cabinet, such as between cabinet frame uprights 362 (e.g., rear cabinet frame uprights) thereof. The support structure 360 is can be coupled to the cabinet frame uprights 362 by screws 365 or the like.

The electrical bus bar support apparatus 102 further includes one or more mounting brackets 364 including a first attachment portion 366 that is configured to couple to the support structure 360, such as by second screws 367 or the like. The first attachment portion 366 can be rectangular in shape and can be planar. A first tab 368 and a second tab 370 each extend from the first attachment portion 366, such as 90 degrees therefrom. The first tab 368 and a second tab 370 can each extend from an end of the first attachment portion 366, such as the lower and upper ends thereof as shown in FIG. 3. An insulating support 372 is coupled to the first tab 368 and the second tab 370, such as by lateral fasteners 274 and nuts 375. The lateral fasteners 274 can be carriage-type fasteners, for example (e.g., ⅜"-16 carriage bolts). The insulating support 372 can be configured to include a rear bus bar support portion 376, a first bus bar end support 377, and a second bus bar end support 378 extending from the rear bus bar support portion 376 and forming the bus bar-receiving opening 103. The insulating support 372 thus includes the bus bar-receiving opening 103 that is open-ended therefore allowing an electrical bus bar (e.g., the first electrical bus bar 104) to be received therein from a front direction. The insulating support 372 can include a C-shape as shown and can be made of a suitable insulation material, such as FR-4 described above, for example. In the depicted embodiment, two assemblies of insulating support 372 and mounting bracket 364 are shown in a spaced apart orientation. The support structure 360 can include a series of holes therein that allow the spacing between the respective assemblies of insulating support 372 and mounting bracket 364 to be adjusted to provide improved support for different applications. Four rows of holes for each of the assemblies of insulating support 372 and mounting bracket 364 allow for substantial spacing adjustment capability.

As should be apparent, in a broad embodiment, a supported electrical bus bar assembly 100 is provided, as best described by reference to FIGS. 1A-1C, 2C, and 3. The supported electrical bus bar assembly 100 includes a support structure 360, a mounting bracket 364 including a first attachment portion 366 configured to couple to the support structure 360, a first tab 368 and a second tab 370 each extending from the first attachment portion 366, and an insulating support 372 coupled to the first tab 368 and the second tab 370, the insulating support 372 including a rear bus bar support portion 376, a first bus bar end support 377, and a second bus bar end support 378 extending from the rear bus bar support portion 376 and forming a bus bar-receiving opening 103.

The supported electrical bus assembly 100 further includes a first electrical bus bar 104 received in the bus bar-receiving opening 103, a second electrical bus bar 106 extending in parallel to the first electrical bus bar 104 and spaced a distance D therefrom, and one or more yoke brace apparatus 108 coupled between the first electrical bus bar 104 and the second electrical bus bar 106. The one or more yoke brace apparatus 108 can include a yoke brace spacer 210 including a first end 212 and a second end 214, a first yoke bracket 216 coupled to the yoke brace spacer 210 on the first end 212, the first yoke bracket 216 coupled to the first electrical bus bar 104, and a second yoke bracket 218 coupled to the yoke brace spacer 210 on the second end 214 opposite from the first end 212, the second yoke bracket 218 coupled to the second electrical bus bar 106.

Figure 5:
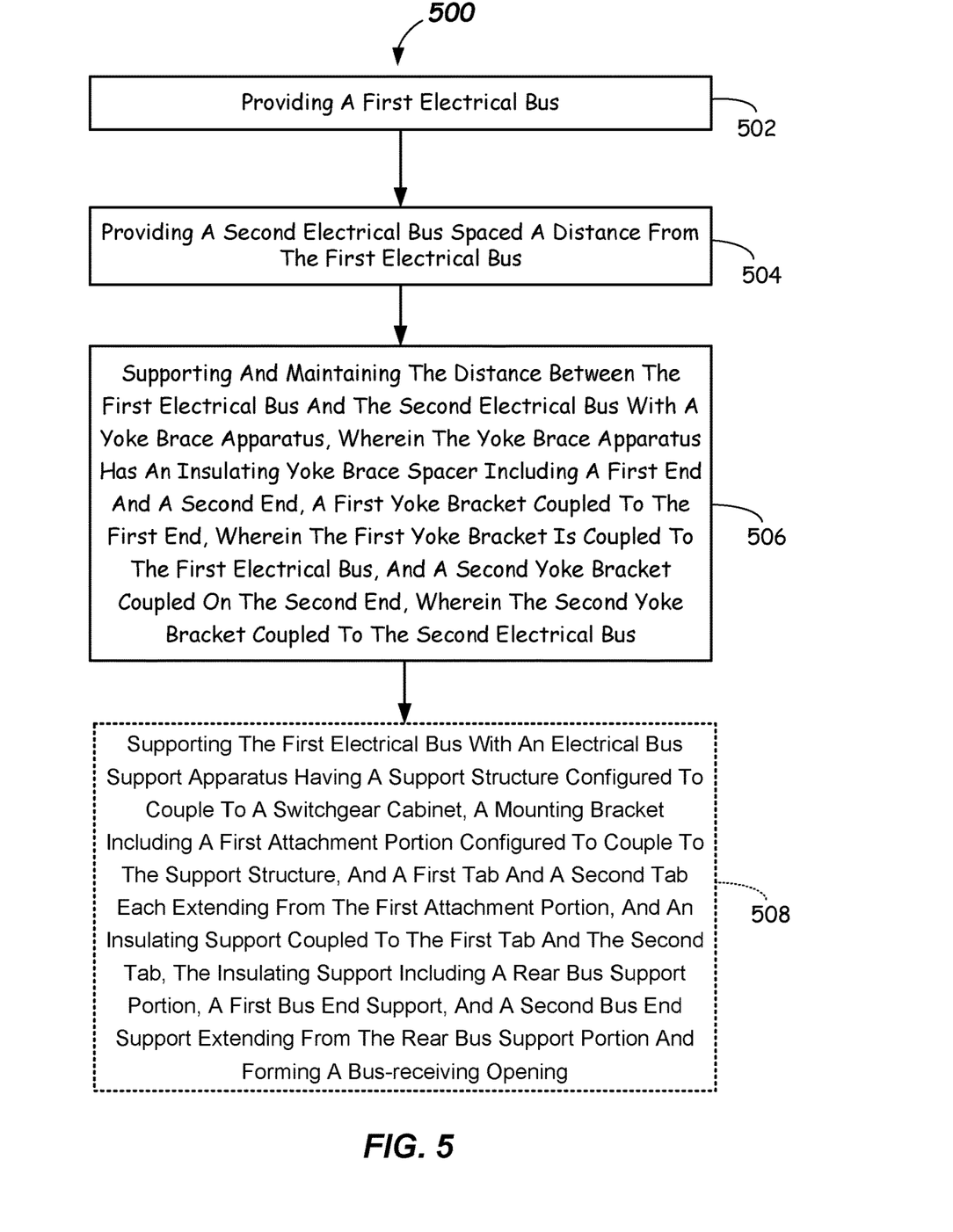
FIG. 5 illustrates a flowchart of a method of supporting electrical bus bars according to embodiments.

FIG. 5 illustrates a method of supporting electrical bus bars. The method 500, involves, in 502, providing a first electrical bus bar (e.g., electrical bus bar 104), and, in 504, providing a second electrical bus bar (e.g., second electrical bus bar 106) spaced a distance (e.g., distance D) from the first electrical bus bar.

The method 500, further involves, in 506, supporting and maintaining the distance D between the first electrical bus bar and the second electrical bus bar with a yoke brace apparatus (e.g., yoke brace apparatus 108). The yoke brace apparatus has an insulating yoke brace spacer (e.g., yoke brace spacer 210) that can include laminated construction of insulating components. The insulating yoke brace spacer can include a first end (e.g., first end 212) and a second end (e.g., second end 214), a first yoke bracket (e.g., first yoke bracket 216) coupled to the first end, wherein the first yoke bracket is coupled to the first electrical bus bar, and a second yoke bracket (e.g., second yoke bracket 218) coupled on the second end, wherein the second yoke bracket is coupled to the second electrical bus bar.

The method 500 can optionally include, in 508, supporting the first electrical bus bar with an electrical bus bar support apparatus (e.g., electrical bus bar support apparatus 102) having a support structure (e.g., support structure 360) configured to couple to a switchgear cabinet (e.g., by attaching to rear frame uprights 362); a mounting bracket (e.g., mounting bracket 364) including a first attachment portion (e.g., first attachment portion 366) configured to couple to the support structure, and a first tab (e.g., first tab 368) and a second tab (e.g., second tab 370) each extending from the first attachment portion; and an insulating support (e.g., insulating support 372) coupled to the first tab and the second tab, the insulating support including a rear bus bar support portion (e.g., rear bus bar support portion 376), a first bus bar end support (e.g., first bus bar end support 377), and a second bus bar end support (e.g., second bus bar end support 378) extending from the rear bus bar support portion and forming a bus bar-receiving opening 103.

It should be readily appreciated by those persons of ordinary skill in the art that the present invention is susceptible of broad utility and application. Many embodiments and adaptations of the present disclosure other than those herein described, as well as many variations, modifications, and equivalent arrangements, will be apparent from, or reasonably suggested by, the present disclosure. Accordingly, while the present invention has been described herein in detail in relation to specific embodiments, it is to be understood that this disclosure is only illustrative and presents examples merely for purposes of providing a full and enabling disclosure. This disclosure is not intended to limit the invention to the particular apparatus, assemblies and/or methods disclosed, but, to the contrary, the intention is to cover all modifications, equivalents, and alternatives falling within the scope of the claims.

What is claimed is:

1. An electrical bus bar assembly, comprising:
   a first electrical bus bar;
   a second electrical bus bar spaced a distance from the first electrical bus bar; and
   a yoke brace apparatus coupled between the first electrical bus bar and the second electrical bus bar, the yoke brace apparatus comprising:
      a yoke brace spacer including a first end and a second end,
      a first yoke bracket coupled to the yoke brace spacer on the first end, the first yoke bracket coupled to the first electrical bus bar, such that a first side of the first electrical bus bar faces the first yoke bracket and a second side of the first electrical bus bar opposite the first side of the first electrical bus bar faces the first end of the yoke brace spacer, and
      a second yoke bracket coupled to the yoke brace spacer on the second end opposite from the first end, the second yoke bracket coupled to the second electrical bus bar.

2. The electrical bus assembly of claim 1, further comprising a first inner insulating barrier received inside of the first yoke bracket.

3. The electrical bus assembly of claim 2, wherein the first inner insulating barrier comprises a U-shaped configuration partially surrounding the first electrical bus bar.

4. The electrical bus assembly of claim 1, wherein a portion of the second bus bar that is supported by the yoke brace apparatus extends parallel to the first electrical bus bar.

5. The electrical bus assembly of claim 1, further comprising a second inner insulating barrier received inside of the second yoke bracket.

6. The electrical bus assembly of claim 1, further comprising a second yoke brace apparatus coupled between the first electrical bus bar and the second electrical bus bar and spaced from the yoke brace apparatus, the second yoke brace apparatus comprising:
   a yoke brace spacer including a first end and a second end,
   a first yoke bracket coupled to the yoke brace spacer on the first end, the first yoke bracket coupled to the first electrical bus bar, and
   a second yoke bracket coupled to the yoke brace spacer on a second end opposite from the first end, the second yoke bracket coupled to the second electrical bus bar.

7. The electrical bus assembly of claim 1, further comprising:
a first insulation sheathing wrapping about a portion of the first electrical bus bar passing through the first yoke bracket.

8. The electrical bus assembly of claim 1, further comprising:
a second insulation sheathing wrapping about a portion of the second electrical bus bar passing through the second yoke bracket.

9. A yoke brace apparatus, comprising:
a yoke brace spacer including a first end and a second end;
a first yoke bracket coupled to the yoke brace spacer on the first end, the first yoke bracket including a first channel configured to couple to a first electrical bus bar, such that a first side of the first electrical bus bar faces the first yoke bracket and a second side of the first electrical bus bar opposite the first side of the first electrical bus bar faces the first end of the yoke brace spacer; and
a second yoke bracket coupled to the yoke brace spacer on the second end opposite from the first end, the second yoke bracket including a second channel configured to couple to a second electrical bus bar,
wherein the yoke brace apparatus is configured to maintain a fixed axial spacing between the first channel and the second channel.

10. The yoke brace apparatus of claim 9, further comprising a first inner insulating barrier received within the first yoke bracket.

11. The yoke brace apparatus of claim 9, further comprising a second inner insulating barrier received within the second yoke bracket.

12. The yoke brace apparatus of claim 9, further comprising an outer insulating barrier received over the second yoke bracket.

13. The yoke brace apparatus of claim 9, further comprising a plate insulating barrier received over the first yoke bracket.

14. The yoke brace apparatus of claim 9, wherein the yoke brace spacer comprises a laminated construction.

15. The yoke brace apparatus of claim 9, wherein the yoke brace spacer comprises structural laminate components having a first rigidity and spacer laminate components having a second rigidity less than the first rigidity.

16. The yoke brace apparatus of claim 9, comprising length adjustment.

17. An electrical bus bar support apparatus for an electrical bus bar, comprising:
a support structure configured to couple to a switchgear cabinet;
a mounting bracket including a first attachment portion configured to couple to the support structure, and a first tab and a second tab each extending from the first attachment portion; and
an insulating support coupled to the first tab and the second tab, the insulating support including a rear bus bar support portion, a first bus bar end support, and a second bus bar end support extending from the rear bus bar support portion and forming a bus bar-receiving opening.

18. The electrical bus support apparatus of claim 17, further comprising an electrical bus bar received in the forming a bus bar-receiving opening.

19. A supported electrical bus bar assembly, comprising:
an electrical bus bar support apparatus including a support structure, a mounting bracket including a first attachment portion configured to couple to the support structure, a first tab and a second tab each extending from the first attachment portion, and an insulating support coupled to the first tab and the second tab, the insulating support including a rear bus bar support portion, a first bus bar end support, and a second bus bar end support extending from the rear bus bar support portion and forming a bus bar-receiving opening;
a first electrical bus bar received in the bus bar-receiving opening;
a second electrical bus bar extending parallel to the first electrical bus bar and spaced a distance therefrom; and
a yoke brace apparatus coupled between the first electrical bus bar and the second electrical bus bar, the yoke brace apparatus, comprising:
a yoke brace spacer including a first end and a second end,
a first yoke bracket attached to the yoke brace spacer on the first end, the first yoke bracket coupled to the first electrical bus bar, and
a second yoke bracket attached to the yoke brace spacer on the second end opposite from the first end, the second yoke bracket coupled to the second electrical bus bar.

20. A method of supporting electrical bus bars, comprising:
providing a first electrical bus bar;
providing a second electrical bus bar spaced a distance from the first electrical bus bar; and
supporting and maintaining the distance between the first electrical bus bar and the second electrical bus bar with a yoke brace apparatus, wherein the yoke brace apparatus has an insulating yoke brace spacer including a first end and a second end, a first yoke bracket attached to the first end, wherein the first yoke bracket is coupled to the first electrical bus bar, such that a first side of the first electrical bus bar faces the first yoke bracket and a second side of the first electrical bus bar opposite the first side of the first electrical bus bar faces the first end of the yoke brace spacer, and a second yoke bracket attached on the second end, wherein the second yoke bracket is coupled to the second electrical bus bar.

21. The method of claim 20, further comprising supporting the first electrical bus bar with an electrical bus bar support apparatus having a support structure configured to couple to a switchgear cabinet; a mounting bracket including a first attachment portion configured to couple to the support structure, and a first tab and a second tab each extending from the first attachment portion; and an insulating support coupled to the first tab and the second tab, the insulating support including a rear bus bar support portion, a first bus bar end support, and a second bus bar end support extending from the rear bus bar support portion and forming a bus bar-receiving opening.

* * * * *